Nov. 8, 1949  W. G. ALSOP  2,487,208
PREPARATION OF DIGLYCEROLS
Filed Dec. 23, 1946
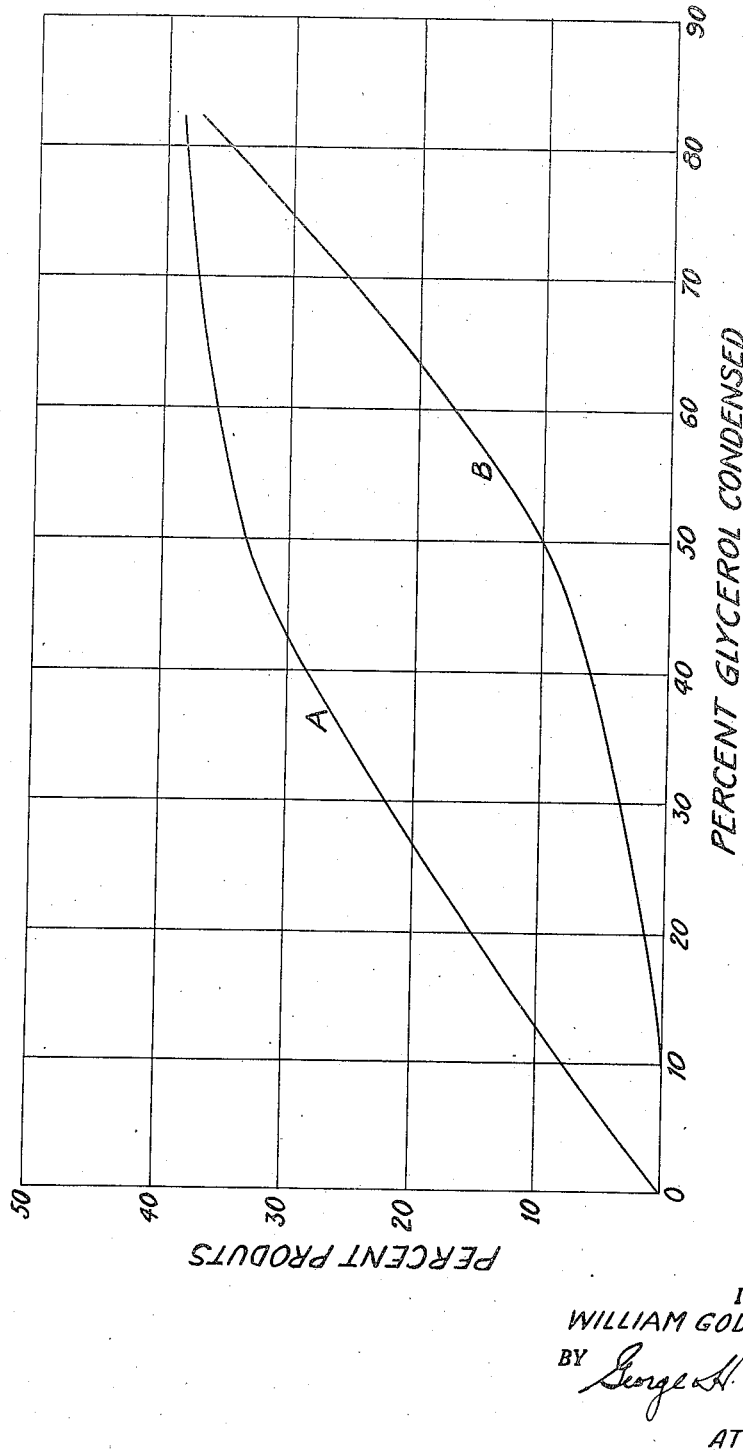
INVENTOR.
WILLIAM GODFREY ALSOP
BY George H. Mortimer
ATTORNEY Patented Nov. 8, 1949

2,487,208

UNITED STATES PATENT OFFICE 2,487,208

PREPARATION OF DIGLYCEROL

William Godfrey Alsop, New York, N. Y., assignor to Colgate-Palmolive-Peet Company, Jersey City, N. J., a corporation of Delaware Application December 23, 1946, Serial No. 718,060

2 Claims. (Cl. 260—615)

This invention relates to the preparation of diglycerol, and more particularly to the recovery of diglycerol in relatively pure condition by distillation from a reaction mixture containing catalyst, and without excessive formation of higher polyglycerols.

The preparation of polyglycerols has been carried out in the past by heating glycerol in the presence of a catalyst and removing water through a reflux condenser, with subsequent distillation of the reaction mixture to separate the products.

In separating the products of the reaction by distillation as carried out in the past, the initial fraction separated from the mixture comprised the more volatile glycerol, and the catalyst remained in the mixture which contained a substantial proportion of polyglycerols. The mixture remained at a relatively high temperature and underwent further reaction by virtue of the presence of the active catalyst, such reaction causing a reduction in the amount of diglycerol contained therein.

It is believed that the condensation of glycerol comprises several stages of reaction which are carried on simultaneously. The glycerol and polyglycerol components of the system appear reactive with each other, and in the course of the reaction, the concentration of each of these components tends to reach a maximum value and thereafter to decline as the higher condensation products are formed. It has now been found that in the manufacture of diglycerol, the desired material, being a product of the primary reaction, approaches its optimum concentration after relatively little condensation has taken place and before appreciable proportions of triglycerol or higher condensation products are formed.

It is an object of this invention to provide a method for producing and recovering diglycerol from glycerol in which no more than a small quantity of the material reacted is condensed into polyglycerols higher than diglycerol.

Other objects and advantages of this invention will be apparent to those skilled in the art from the following description, taken in conjunction with the accompanying drawing, in which the single figure shows curves graphically representing approximate concentrations, neglecting thermal condensation during distillation, of two classes of reaction products in terms of the amount of original reagent consumed.

The present invention comprises causing the condensation-polymerization of glycerol in the presence of a suitable catalyst to a degree that a high or substantial quantity of diglycerol, but no more than a small quantity of higher polyglycerols, has been produced, deactivating the catalyst and separating the components of the mixture by distillation.

Glycerol condenses to form polyglycerols without any catalyst under conditions of high temperature, the rate of such thermal condensation being very slow as compared with the rate when a suitable catalyst is employed. This invention therefore contemplates inactivating the catalyst in the reaction mixture after a desired degree of condensation, thereby limiting any further reaction during subsequent treatment at elevated temperature to the relatively slow rate of thermal condensation.

Curve A represents approximate concentrations of diglycerol in terms of the amount of glycerol condensed in a mixture wherein glycerol is undergoing condensation into polyglycerols.

Curve B represents approximate concentrations of polyglycerols higher than diglycerol in terms of the amount of glycerol condensed in a mixture wherein glycerol is undergoing condensation into polyglycerols.

The curves show that the rate of increase in concentration of polyglycerols higher than diglycerol does not become significantly large in relation to the rate of increase in diglycerol concentration until a substantial portion of the glycerol originally present has been condensed.

It will be apparent to one skilled in the art from the data shown in the curves that when a high proportion such as 70 to 80% of the glycerol originally present in the mixture has been condensed in the reaction, a proportion of the mixture of the order of 25 to 35% will have been converted into polyglycerols higher than diglycerol. It is because of this tendency, which can also be seen indicated earlier in the reaction, that it appears desirable to separate the products of the reaction after a relatively small proportion of the original glycerol has been condensed, for although less diglycerol is then present in the mixture than would be if the reaction were carried further, a high proportion of the remaining material is glycerol, which if recovered intact may be used again in the process.

When a catalyst such as sodium hydroxide, potassium hydroxide, sodium carbonate and other alkaline compounds is used, the catalyst is rendered ineffective before distillation and further undesirable reactions inhibited by adding to the reaction mixture approximately a stoichiometric quantity of a suitable acid or other catalyst-consuming reagent. The effect of such reagents in reacting with alkaline catalysts is to produce materials which are not catalysts for further condensation.

The acid or catalyst-consuming reagent employed is preferably one which does not tend to undergo or to catalyze side reactions with any of the components of the reaction mixture, and which does not form by reaction with the catalyst any products which may undergo or accelerate such reactions. Hydrochloric acid may be used with alkaline catalysts, forming salts which appear to have no catalytic effect during subsequent distillation. Other reagents and acidic substances may be used which tend to form similar salts, for example acetyl chloride, ammonium chloride and some alkyl amine hydrochlorides, including methyl amine hydrochloride, ethyl amine hydrochloride, propyl amine hydrochloride, etc. Substances comprising other halides may be used and still other substances with the limitation that reagents or catalysts for further reactions within the mixture are not thereby introduced or formed.

Conditions of temperature in the condensation reaction may be those generally used in the preparation of diglycerol of which the temperature is usually below that required for boiling glycerol under a pressure of one atmosphere. The reaction appears to be substantially independent of pressure conditions and the process may be effectively carried out at or near atmospheric pressure. A small positive pressure of an inert gas, for example carbon dioxide or nitrogen, may accompany the reaction in order to reduce the possibility of oxidation.

Where the catalyst-consuming reagent is of a volatile nature and susceptible, upon introduction into the hot mixture, of rapid vaporization such as will cause it to be removed from the mixture before the intended reaction takes place, the mixture may be cooled before addition of the deactifying agent. One method of rapid cooling within a limited range comprises subjecting the mixture to reduced pressure and distilling off the more volatile components including glycerol without addition of heat, continuing until the temperature has been reduced a desired amount. Use of this method produces a beneficial effect in removing matter which would subsequently be distilled off in any event.

Catalysts utilized in the process may be among those heretofore known to be suitable for accelerating the condensation of glycerol which are basic or which may be neutralized by a monobasic strong acid or salt-forming reagent corresponding thereto. Some examples of catalysts are sodium hydroxide, potassium hydroxide, barium hydroxide, magnesium hydroxide, sodium carbonate, sodium bicarbonate, sodium acetate, sodium silicate, calcium oxide and alkali metal salts of fatty acids.

The composition of the reaction mixture may be determined or estimated during the process by neutralizing portions of the mixture and analyzing them by distillation, by measuring the amount of water given off during the reaction or by comparing time of reaction in a run with time required to achieve known results previously under the same or similar conditions.

Separation of the products of the reaction may be accomplished by distillation, using methods including those heretofore employed in the production of diglycerol, for example vacuum distillation, continuous rectification and other convenient forms.

Batch vacuum distillation may be utilized for product purification and glycerol recovery, particularly where the diglycerol formed in the process is of sufficient purity to be marketable after water and glycerol have been removed from the reaction mixture. In such a distillation the final portion of glycerol distilled from each batch may carry a high proportion of diglycerol and that final portion may be set aside and admixed with the reaction mixture of the next succeeding batch prior to its distillation, a similar portion being set aside from said next batch, etc. This practice results in improved efficiency in distillation.

The following examples are to illustrate but not to limit this invention:

Example I 1000 parts by weight of glycerol are placed in a reaction vessel which is fitted with a reflux condenser, and 5 parts of water containing 0.1 part sodium hydroxide are added. The mixture is heated to 270° C. and held between this temperature and 280° C. for one and one-half hours. The temperature in the reflux column is controlled near 150° C. to allow water to pass through and to liquefy glycerol and any higher-boiling vapor components. The reaction mass is then cooled and a sample removed therefrom. The sample is mixed with 0.091 part hydrochloric acid in aqueous solution and the acidified mass returned to the reaction mixture. After thorough mixing of the acidified portion with the crude polymer, the mixture is distilled at 1 mm. to give 67% glycerol, 27% diglycerol and 6% residue including higher polymers. A portion of identical product distilled similarly without acidification gives 40% glycerol, 32% diglycerol and 28% residue.

Example II 1000 parts by weight of glycerol are placed in a reaction vessel and to the glycerol are added 5 parts of water containing 0.1 part potassium hydroxide. The mixture is held between 270° C. and 280° C. and refluxed for two hours as in Example I. The reaction mass is cooled, neutralized with an aqueous solution containing 0.055 part of hydrochloric acid, and distilled at 1 mm. to give 66% glycerol, 28% diglycerol and 6% residue. When a portion of identical product was distilled without addition of acid, the mixture upon separation yielded 42% glycerol, 26% diglycerol and 32% residue.

Example III 1000 parts by weight of glycerol are placed in a reaction vessel and to the glycerol are added 20 parts of water containing one part of sodium acetate. The mixture is held between 270° and 280° C. and refluxed as in Example I for one and one-half hours. The reaction mixture is then cooled, neutralized with an aqueous solution containing 0.044 part hydrochloric acid and distilled at 1 mm. to give 64% glycerol, 29% diglycerol and 7% residue. When the reaction mixture was distilled without deactivation of catalyst, products totalled 56% glycerol, 26% diglycerol and 18% residue.

Example IV 1000 parts by weight of glycerol are heated for one and one-half hours between 270° and 280° C. in the presence of 10 parts of hydrated waterglass containing 22.5% sodium monoxide, 58.8% silicon dioxide and 18.7% water. Water is continuously removed from the system during the reaction through a reflux condenser at approximately 150° C. which liquefies and returns glycerol and other high-boiling vapor components to the reaction mixture. After one and one-half hours the mixture is cooled and neutralized with an aqueous solution containing 1.18 parts hydrochloric acid. Upon distillation at 1 mm. the products were recovered as 68% glycerol, 26% diglycerol and 6% residue. Where the catalyst was not deactivated, the same product yielded 46% glycerol, 28% diglycerol and 26% residue.

*Example V*

1000 parts by weight of glycerol are heated at 240° C. for 3 hours in the presence of 5 parts of sodium hydroxide and water is distilled from the mixture. A portion of the mixture is treated with an exact equivalent of hydrochloric acid and distilled. A second portion is treated with pyridine hydrochloride in an amount equivalent to the sodium ion therein and that portion distilled. A third portion of the mixture is distilled without further treatment.

The products of distillation are as follows:

| Treatment | Glycerol | Diglycerol | Residue |
|---|---|---|---|
| | Per cent | Per cent | Per cent |
| Hydrochloric Acid | 77 | 20 | [1]3 |
| Pyridine Hydrochloride | 77 | 19 | 4 |
| Untreated | 74 | 12 | 14 |

*Example VI*

1000 parts by weight of glycerol are heated at 220° C. for 4 hours in the presence of 20 parts of sodium hydroxide, water being distilled from the mixture during the period. A portion of the resulting mixture is treated with an exact equivalent of hydrochloric acid and distilled. A second portion is treated with n-hexyl amine hydrochloride in an amount equivalent to the sodium ion therein and distilled. A third portion of the mixture is distilled without further treatment. The distillations result in separation of the following products:

| Treatment | Glycerol | Diglycerol | Residue |
|---|---|---|---|
| | Per cent | Per cent | Per cent |
| Hydrochloric Acid | 74 | 23 | [1]3 |
| N-Hexyl Amine Hydrochloride | [2]74 | 22 | [1]4 |
| Untreated | 70 | 10 | 20 |

[1] Contains sodium chloride.
[2] Free amine distilled with glycerol.

*Example VII*

1000 parts by weight of glycerol are heated at 220° C. for 5 hours in the presence of 20 parts of hydrated water-glass containing 22.5% sodium monoxide, 58.8% silicon dioxide and 18.7% water. At the end of this time a portion of the mixture is treated with an amount of hydrochloric acid exactly equivalent to the soduim ion in the mixture and is distilled. Another portion of the mixture is distilled without further treatment.

The products of distillation are:

| Treatment | Glycerol | Diglycerol | Residue |
|---|---|---|---|
| | Per cent | Per cent | Per cent |
| Hydrochloric Acid | 65 | 26 | [1]9 |
| Untreated | 57 | 25 | [2]18 |

[1] Contains sodium chloride and silica.
[2] Contains sodium silicate.

*Example VIII*

Under the conditions of Example VII, using 20 parts by weight of sodium carbonate as catalyst in lieu of the water-glass and treating the mixture in part with hydrochloric acid before distillation, the following results were obtained:

| Treatment | Glycerol | Diglycerol | Residue |
|---|---|---|---|
| | Per cent | Per cent | Per cent |
| Hydrochloric Acid | 73 | 20 | [1]7 |
| Untreated | 68 | 18 | 14 |

[1] Contains sodium chloride.

Having thus described a limited number of forms of my invention, it should be understood that I do not wish to be narrowly bound except as defined in the appended claims.

I claim:

1. The process for making diglycerol which comprises heating glycerol in the presence of a catalyst to a temperature at which condensation-polymerization takes place for a period of time sufficient to produce a substantial amount of diglycerol, deactifying the catalyst before the amount of condensed glycerol exceeds 50%, and distilling the reaction mixture to recover unreacted glycerol and diglycerol.

2. The process of producing diglycerol which comprises heating glycerol in the presence of an alkaline catalyst at a temperature of about 220° C. to 280° C. for a period of time sufficient to produce a substantial amount of diglycerol, neutralizing the catalyst before the amount of condensed glycerol exceeds 50%, fractionally distilling unreacted glycerol and diglycerol from the reaction mixture, and retreating the unreacted glycerol including a fraction containing some diglycerol with additional glycerol and catalyst.

WILLIAM GODFREY ALSOP.

REFERENCES CITED

The following references are of record in the file of this patent:

UNITED STATES PATENTS

| Number | Name | Date |
|---|---|---|
| 969,159 | Fleming | Sept. 6, 1910 |
| 1,763,451 | Weber | June 10, 1930 |

FOREIGN PATENTS

| Number | Country | Date |
|---|---|---|
| 113,384 | Australia | July 1, 1941 |